United States Patent [19]

Parks

[11] Patent Number: 4,897,008
[45] Date of Patent: Jan. 30, 1990

[54] ANTI-TAMPER NUT

[75] Inventor: Jeffery R. Parks, Elma, N.Y.

[73] Assignee: McGard, Inc., Buffalo, N.Y.

[21] Appl. No.: 258,871

[22] Filed: Oct. 17, 1988

[51] Int. Cl.⁴ ............................................. F16B 41/00
[52] U.S. Cl. .................... 411/432; 411/910; 411/431; 70/239
[58] Field of Search ............... 411/432, 429, 430, 431, 411/910; 70/231

[56] References Cited

U.S. PATENT DOCUMENTS

| | | | |
|---|---|---|---|
| 1,447,564 | 3/1923 | Norlund | 411/910 |
| 2,823,725 | 2/1958 | Trinca | 70/231 |
| 2,889,733 | 6/1959 | Vanderhoof | 411/432 |
| 3,060,785 | 10/1962 | Corlett | 411/910 |
| 3,471,158 | 10/1969 | Solins | 411/431 |
| 3,519,979 | 7/1970 | Bodenstein | 411/910 |
| 4,037,515 | 7/1977 | Kesselman | 411/910 |
| 4,231,240 | 11/1980 | Fujita | 70/231 |
| 4,580,935 | 4/1986 | Treihaft | 411/910 |
| 4,693,655 | 9/1987 | Omori | 411/910 |
| 4,742,702 | 5/1988 | Swertz | 70/231 |

FOREIGN PATENT DOCUMENTS

| | | | |
|---|---|---|---|
| 0153487 | 12/1984 | European Pat. Off. | 411/429 |
| 832019 | 4/1960 | United Kingdom | 411/429 |
| 2186936 | 8/1987 | United Kingdom | 411/910 |

Primary Examiner—Gary L. Smith
Assistant Examiner—Flemming Saether
Attorney, Agent, or Firm—Joseph P. Gastel

[57] ABSTRACT

A locknut including an annular locknut body having a threaded inner surface and an outer surface, a locknut shroud rotatably mounted on the locknut body and having an inner surface facing the outer surface of the locknut body, an annular ridge on the outer surface of the locknut body defining a first shoulder, a second shoulder within the annular shroud, an O-ring mounted on an inclined surface of the locknut body and bearing against an inclined surface on the annular shroud to force the first and second shoulders into abutting engagement, an annular space between the inner surface of the annular shroud and the outer surface of the locknut body, and a plurality of lobes on the outer surface of the locknut body and located in the annular space for receiving a mating key.

14 Claims, 2 Drawing Sheets

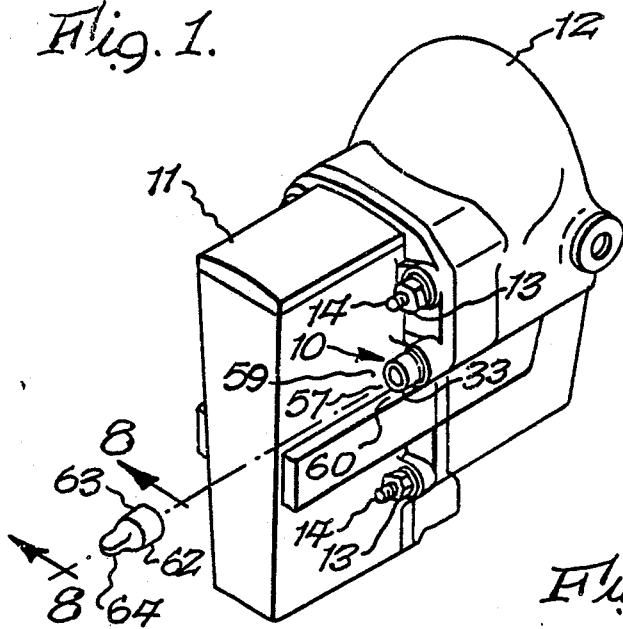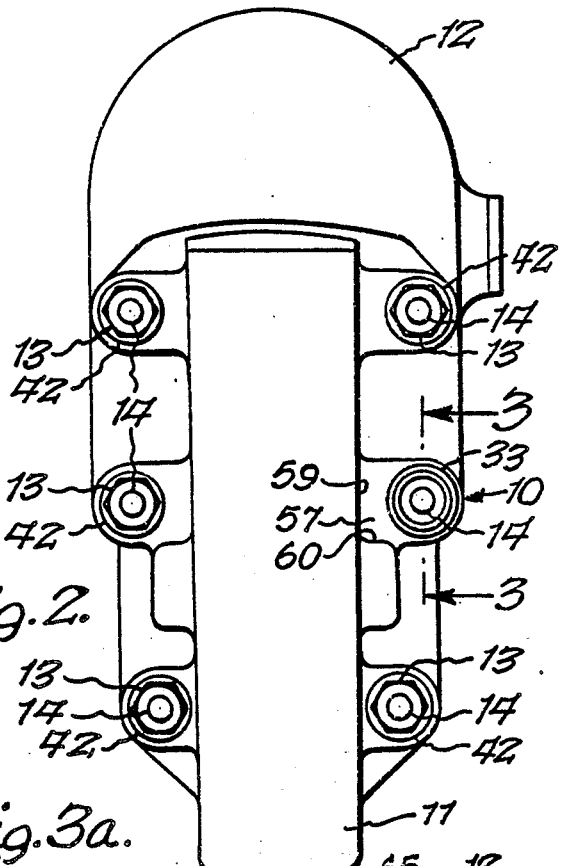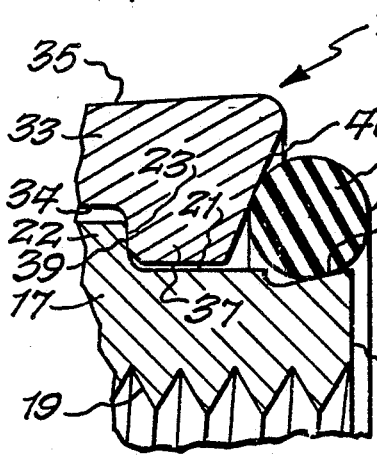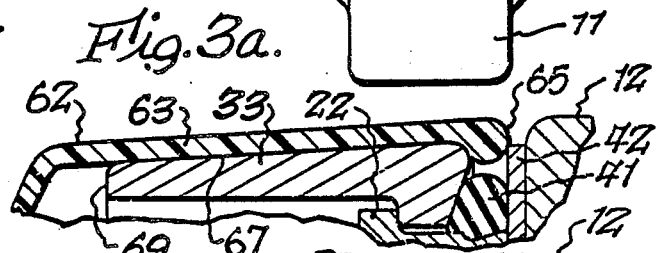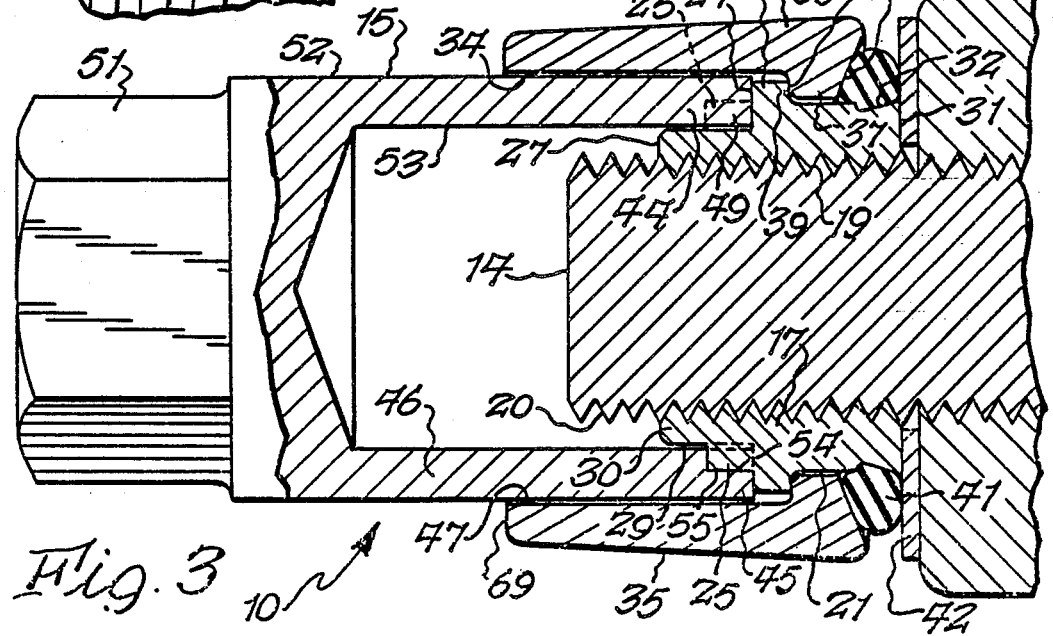

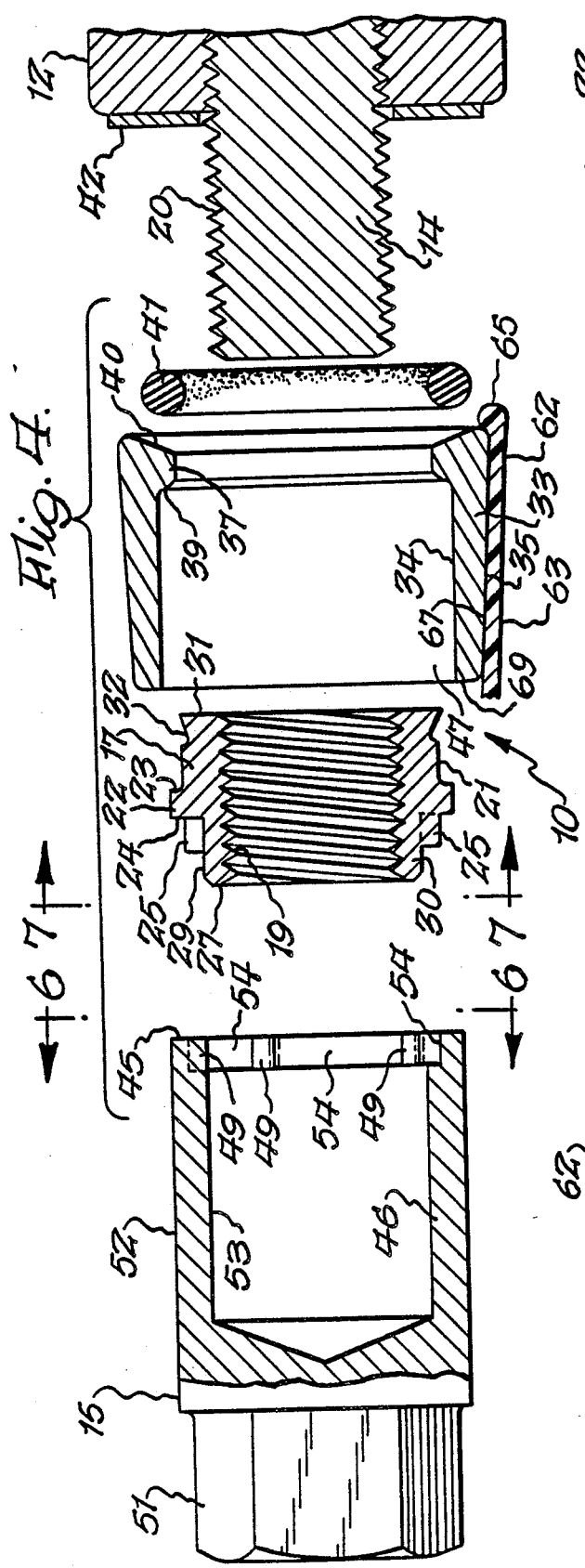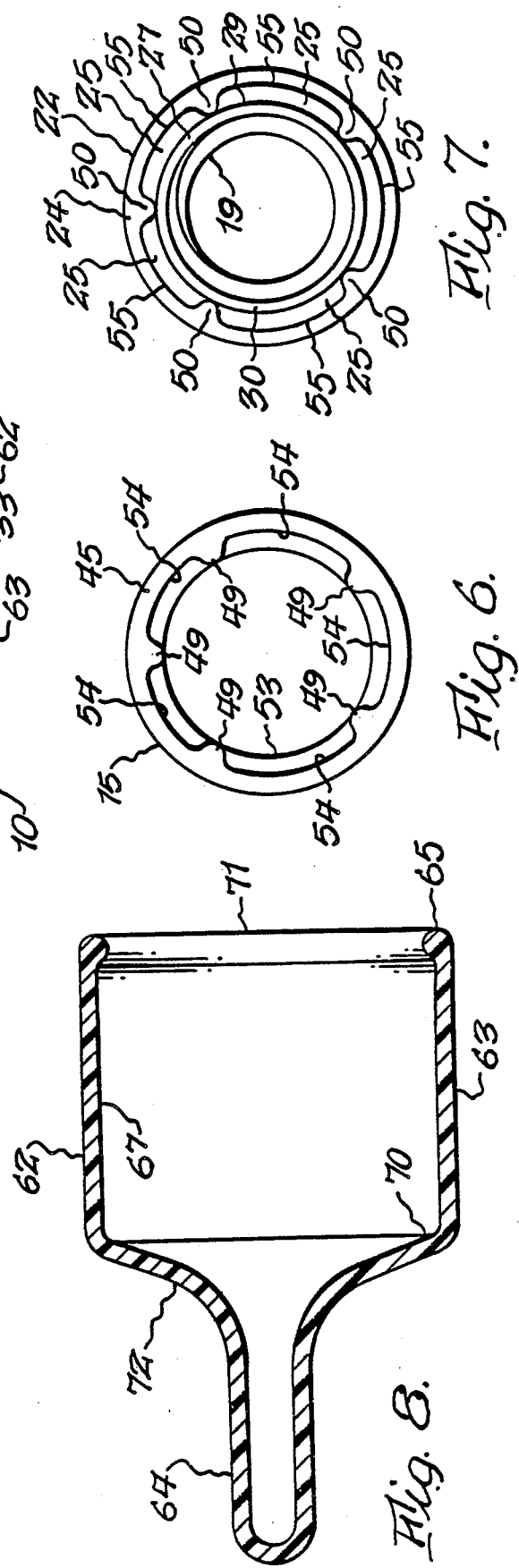

ANTI-TAMPER NUT

BACKGROUND OF THE INVENTION

The present invention relates to an improved locknut construction which can only be removed by the use of a mating key.

By way of background, there are certain instances wherein two objects have to be locked together against unauthorized separation. One example is the outboard member of an inboard-outboard marine drive wherein the outboard member is attached to another member by means of conventional hexagonal nuts which are readily removable by a conventional wrench, thereby leaving the outboard member open to the theft.

SUMMARY OF THE INVENTION

It is the primary object of the present invention to provide an improved locknut which can be mounted on an associated stud for locking two objects together against unauthorized removal.

Another object of the present invention is to provide an improved locknut which has parts assembled in an unique manner by an O-ring which also serves the function of providing a seal not only between the parts but also with the object on which the locknut is mounted.

A further object of the present invention is to provide an improved locknut which possesses a plurality of uniquely integrated parts and which can be turned only by the use of a mating key. Other objects and attendant objects advantages of the present invention will readily be perceived hereafter.

The present invention relates to a locknut comprising an annular locknut body having an inner surface and an outer surface, means on said inner surface for engaging a lug in mounted relationship, an annular shroud having an inner surface and an outer surface, means rotatably mounting said annular shroud is substantially coaxial relationship with said annular locknut body with said outer surface of said annular locknut body facing said inner surface of said annular shroud, key-receiving lobe means on said outer surface of said annular locknut body, said lobe means extending both radially and axially of said locknut body, and a key-receiving opening in said annular shroud.

The various aspects of the present invention will be more fully understood when the following portions of the specification are read in conjunction with the accompanying drawings wherein:

BRIEF DESCRIPTION OF THE DRAWINGS

FIG. 1 is a fragmentary perspective view of the the outer portion of an inboard-outboard marine drive secured to its bell housing by a plurality of lug-mounted nuts and locked thereto by the improved locknut of the present invention;

FIG. 2 is an end elevational view of the subject matter of FIG. 1;

FIG. 3 is a fragmentary enlarged cross sectional view taken substantially along line 3—3 of FIG. 2 and showing in addition a locknut key in engagement with the locknut;

FIG. 3a is a fragmentary cross sectional view of a locknut mounted on a stud with the protective cap of FIG. 8 installed thereon;

FIG. 4 is a fragmentary exploded view of the parts shown in assembled relationship in FIG. 3;

FIG. 5 is a fragmentary cross sectional view of the end portion of the locknut on which the O-ring is mounted;

FIG. 6 is a view taken substantially in the direction of arrows 6—6 of FIG. 4 and showing the contour of the key;

FIG. 7 is a view taken substantially in the direction of arrows 7—7 of FIG. 4 and showing the lobes on the locknut; and FIG. 8 is a cross sectional view taken substantially along line 8—8 of FIG. 1 and showing the cap which is utilized to cover the locknut when the key is not being used.

DESCRIPTION OF THE PREFERRED EMBODIMENTS

The improved locknut 10 is intended for universal usage wherein two members are to be locked together against unauthorized removal. However, it will be described in an environment wherein the outboard member 11 of an inboard-outboard marine drive is secured to the bell housing 12 thereof. As explained above, the locknut 10 prevents unauthorized removal of outboard member 11.

By way of background, outboard member 11 has heretofore been normally secured to bell member 12 by a plurality of conventional hexagonal nuts 13, in this instance six, which are threadably secured onto studs 14 which extend outwardly from bell member 12. As will be readily appreciated, when six nuts 13 are used, without more, they can be removed by means of a conventional wrench, and the outboard member 11 can be separated from bell member 12 by anyone who desires to do this.

In accordance with the present invention, a locknut 10 replaces one of the conventional nuts 13, as shown in FIGS. 1 and 2, and since locknut 10 can be removed from stud 14 only be a special key 15, outboard member 11 cannot be removed except by a person having key 15.

The improved locknut 10 includes an annular locknut body 17 having an inner threaded surface 19 for threadably mounting on outer threaded surface 20 of stud 14. Locknut body 17 also includes an outer surface 21 which includes an annular ridge 22 defining a shoulder 23. A face 24 is located on ridge 22 on the opposite side thereof from shoulder 23, and a plurality of lobes 25 extend axially from face 24 toward end 27 of locknut body 17. Lobes 25 also extend radially outwardly from locknut outer surface 29 which is located on locknut portion 30 which extends axially outwardly beyond lobes 25 toward end 27. The locknut body 17 also includes an opposite end 31 and proximate this end is an annular surface 32 which extends transversely to the longitudinal axis of the locknut.

An annular shroud 33 includes an inner surface 34 and a frustoconical outer surface 35. It also includes an annular ridge 37 having an annular shoulder 39 on one side thereof which is in abutting engagement with annular shoulder 23 of locknut body 17 when the two are assembled as shown in FIG. 3. The opposite side of annular ridge 37 is defined by annular surface 40 which extends transversely to the longitudinal axis of shroud 33.

An O-ring 41 maintains shroud 33 in assembled relationship on locknut body 17. In this respect, it is stretched to fit onto annular surface 32 of locknut body 17 and it bears against surface 40 of shroud 33 to force shoulders 23 and 39 into engagement as shown in FIG. 5. O-ring 41 is in tension when it is mounted on annular surface 32 to achieve the foregoing. The O-ring performs a plurality of functions in addition to maintaining the locknut body 17 and shroud 33 assembled. These additional functions are (1) to prevent vibration therebetween by biasing the shoulders 23 and 39 into engagement, (2) to center the shroud 33 onto the locknut body 17 because of the relationship between inclined surfaces 32 and 40 when O-ring 41 is essentially compressed therebetween, and (3) to provide a seal with washer 42 when locknut 10 is mounted onto stud 14 (FIG. 3). In the latter respect, the outer portion 43 of O-ring 41 extends beyond end 31 of locknut body 17 (FIG>5) before the latter is mounted onto stud 14 in the position of FIG. 3. Therefore portion 43 of the O-ring will bear against washer 42 and provide a seal therewith.

When locknut body 17 and shroud 33 are in assembled relationship with O-ring 41, the centering action of the O-ring, as expressed above, causes a uniform annular axially extending space 44 to exist between outer surface 29 of locknut body 17 and inner surface 34 of shroud 33. Thus, when the end 45 of key 15 is inserted into key-receiving opening 47 of shroud 33, it will readily enter the annular space 44 so that the lobes 49 at the end 45 of cylindrical body 46 of key 15 will enter the spaces 50 between lobes 25 of locknut body 17 to establish a driving relationship therebetween. A hexagonal head 51 is formed on key 15 to receive a wrench to effect tightening and loosening of locknut 10.

As can be seen from FIG. 4, body 46 includes an external surface 52 which is located proximate internal surface 34 of shroud 33 when the parts are assembled, as shown in FIG. 3, and it also includes an internal surface 53, the end portion of which is located proximate locknut body surface 29 when the two are in assembled relationship. The surfaces 54 (FIG. 6) of key 15 lie in contiguous relationship to surfaces 55 (FIG. 5) of lobes 25 when the two are in assembled relationship. Because of the foregoing close fit between the key and the locknut body, a good driving relationship is maintained during tightening and loosening of the locknut body relative to stud 14. In addition, the lobes 25 and 49 and the related surfaces are dimensioned in such a manner and they are of the required hardness so that substantially full contact has to be established therebetween in order to effect a driving relationship without stripping the lobes on the locknut body. Further more, the lobes on the locknut body are sufficiently soft so that they would be stripped if an improvised key were attempted to be used to turn the locknut body. Furthermore, the lobes 25 are located in the extremely narrow annular space 44 between surfaces 29 and 34 so that entry of an item other than a key of the type disclosed for turning the locknut is virtually impossible.

The shroud 33, because of the above-described mounting structure onto locknut body 17, is rotatable thereon. If an attempt were made to turn locknut body 17 by turning shroud 33 when the locknut is tightly mounted on stud 14, the only thing that would be accomplished would be to rotate the shroud on the locknut body without turning the latter. Furthermore, because of the frustoconical configuration of outer surface 35, a wrench cannot be applied to this outer surface with sufficient turning force to turn it, especially considering that it is fabricated out of extremely hard metal into which a wrench cannot bite. In addition, it is to be noted that the locknut 10 is located in area 57 between surfaces 59 and 60 so that a wrench cannot be easily applied to shroud 33.

In FIGS. 1 and 8 a cap 62 is shown for mounting onto shroud 33 to prevent external matter from entering it thereby protecting the locknut body 17 against corrosion from the entry of salt water or the like through shroud end 47, while the O-ring 41 provides a seal against entry of foreign matter from the end 31 of the locknut body.

Cap 62 is fabricated of molded soft plastic material and it includes a cylindrical portion 63 which merges into reduced handle portion 64. Cylindrical portion 63 has a uniform internal diameter 67 which is slightly smaller than the smaller end of the frustoconical outer surface of shroud 33. The plastic of cap 62 is pliable, deformable and stretchable so that the cylindrical portion 63 will stretch when it is forced onto shroud 33. Beaded annular end 65 will pass beyond surface 40. The inherent resilience of the material of cylindrical portion 63 of cap 62 and the bead 65 will retain it in position on shroud 33. In its assembled position on shroud 33, the end 65 will assume the position shown in FIG. 4. The annular shoulder 70 of cap 62 need not abut end 69 of shroud 33.

In order to install cap 62 onto shroud 33, its open end 71 is placed over end 69 of shroud 33, and the handle or tab 64 is grasped between a person's thumb and forefinger. Preferably the thumb and forefinger press against the outer annular surface 72. The cap is then axially forces onto the outer surface 35 of shroud 33 until beaded end 65 passes beyond surface 40. The end portion 65 of cap 62 will thus stretch during its travel along the sleeve and it will then contract after it passes beyond shroud end 40 to provided a good tight fit with shroud 33. Depending on the size of the washer 42, beaded end 65 may provide a seal therewith, as shown in FIG. 3a, or with housing 12. The material of cap 62 will not creep, that is, its memory will tend to cause it to always be biased back to its original molded size. In order to remove cap 62 from shroud 33, the tab or handle 64 is grasped between the thumb and forefinger and it is pulled axially away from shroud 33.

While the above embodiment has been described wherein the locknut body 17 and shroud 33 are maintained in assembled relationship by the use of O-ring 41, it will be appreciated that the present invention intends to encompass a structure wherein the parts need not be maintained in assembled relationship by the coacting relationship between O-ring 41 and surfaces 32 and 40, but the locknut can be a structure wherein the three parts are separate.

While the lobes 25 have been shown as being of equal size and equally spaced, it will be appreciated that infinite combinations of various sizes and various spacings can be used.

While preferred embodiments of the present invention have been disclosed, it will be appreciated that it is not limited thereto but may be otherwise embodied within the scope of the following claims.

What is claimed is:

1. A locknut comprising an annular locknut body having an inner surface and an outer surface, means on said inner surface for engaging a lug in mounted relationship, an annular shroud having an inner surface and an outer surface, said annular shroud being rotatably mounted in substantially coaxial relationship on said annular locknut body with said inner surface of said annular shroud facing said outer surface of said annular locknut body, a first annular ridge on said outer surface of said locknut body, a second annular ridge on said inner surface of said annular shroud, a first shoulder on said first annular ridge, a second shoulder on said second annular ridge for engaging said first annular shoulder, said second annular shoulder having an inner diameter which is greater than the external diameter of said outer surface of said annular locknut body located in contiguous relationship thereto for permitting said rotatable mounting between said annular shroud and said annular locknut body, a first end on said locknut body, a second end on said shroud, said first end extending outwardly beyond said second end when said first and second shoulders are in engagement for permitting said first end to bear against a surface while permitting said second end to be spaced from said surface to thereby permit said shroud to be rotatably mounted on said locknut body, resilient seal means encircling said first end of said locknut body, a first portion on said seal means extending beyond said first end of said locknut body, a second portion on said seal means located on the opposite side thereof from said first portion for engagement by said second end of said shroud, to thereby cause said seal means to be positioned in sealing engagement between said second end of said shroud and said surface when said first end of said locknut body bears against said surface while said resilient characteristic of said seal means permits said relative rotation between said shroud and said locknut body and prevents vibration between said locknut body and said shroud, key-receiving lobe means on said outer surface of said annular locknut body extending both radially and axially of said locknut body, and a key-receiving opening in said annular shroud at the opposite end thereof from said second end of said shroud.

2. A locknut as set forth in claim 1 wherein said lobe means are located proximate said inner surface of said annular shroud.

3. A locknut as set forth in claim 1 including a portion on said annular locknut body which extends further toward said key-receiving opening than said lobe means to define an annular space between said outer surface of said annular locknut body and said inner surface of said annular shroud, and wherein said lobe means are in said annular space.

4. A locknut as set forth in claim 1 including means for maintaining said annular shroud in assembled relationship on said annular locknut body.

5. A locknut as set forth in claim 4 wherein said lobe means are located proximate said inner surface of said annular shroud.

6. A locknut as set forth in claim 4 including a portion on said annular locknut body which extends further toward said key-receiving opening than said lobe means to define an annular space between said outer surface of said annular locknut body and said inner surface of said annular shroud, and wherein said lobe means are in said annular space.

7. A locknut as set forth in claim 4 wherein said means for maintaining said annular shroud in assembled relationship on said annular locknut body comprises said seal means.

8. A locknut as set forth in claim 7 including mounting means mounting said seal means between said annular locknut body and said annular shroud to cause said first and second shoulder means to be in abutting engagement.

9. A locknut as set forth in claim 8 wherein said mounting means comprises a first surface on said annular shroud facing away from said key-receiving opening, a second surface on said annular locknut body facing toward said key-receiving opening, and said seal means being mounted between said first and second surfaces.

10. A locknut as set forth in claim 9 wherein said second surface is located radially inwardly of said first surface, and wherein said annular locknut body and said annular shroud are located on a substantially common longitudinal axis, and wherein said first and second surfaces extend transversely to said longitudinal axis.

11. A locknut comprising an annular locknut body having an inner surface and an outer surface, means on said inner surface for engaging a lug in mounted relationship, an annular shroud having an inner surface and an outer surface, means rotatably mounting said annular shroud in substantially coaxial relationship with said annular locknut body with said outer surface of said annular locknut body facing said inner surface of said annular shroud, key-receiving lobe means on said outer surface of said annular locknut body, said lobe means extending both radially and axially of said locknut body, a key-receiving opening in said annular shroud, means for maintaining said annular shroud in assembled relationship on said annular locknut body, said means for maintaining said annular shroud in assembled relationship on said annular locknut body comprising an O-ring, first shoulder means on said outer surface of said annular locknut body facing away from said key-receiving opening, second shoulder means on said annular shroud facing said first shoulder means, mounting means mounting said O-ring between said annular locknut body and said annular shroud to cause said first and second shoulder means to be in abutting engagement, said mounting means comprising a first surface on said annular shroud facing away from said key-receiving opening, a second surface on said annular locknut body facing toward said key-receiving opening, said O-ring being mounted between said first and second surfaces, said first surface being located proximate the end of said annular shroud remote from said key-receiving opening, and said second surface being located axially beyond said first surface in a direction away from said key-receiving opening, an end on said annular locknut body which is located beyond said second surface in a direction away from said key-receiving opening, and said O-ring including a portion which extends beyond said end of said annular locknut body to provide a seal between said first and second surfaces and an external member located proximate said end of said locknut body.

12. A locknut as set forth in claim 11 wherein said outer surface of said annular shroud is of frustoconical configuration with the portion thereof proximate said key-receiving opening being of smaller diameter.

13. A locknut comprising an annular locknut body having an inner surface and an outer surface, means on said inner surface for engaging a lug in mounted relationship, a first end on said locknut body, an annular shroud having an inner surface and an outer surface, a second end on said shroud, means rotatably mounting said annular shroud in substantially coaxial relationship with said annular locknut body with said outer surface of said annular locknut body facing said inner surface of said annular shroud, said first end on said locknut body extending outwardly beyond said second end on said shroud for permitting said first end to bear against a surface while permitting said second end to be spaced from said surface and permitting said shroud to be rotatably mounted on said locknut body when said first end bears against said surface, key-receiving lobe means on said outer surface of said annular locknut body, said lobe means extending both radially and axially of said locknut body, a key receiving opening in said annular shroud, and means for maintaining said annular shroud in assembled relationship on said annular locknut body comprising an O-ring effectively mounted between said annular locknut body and said annular shroud, said O-ring extending outwardly beyond said first end for engaging said surface and biasing said annular shroud into engagement with said locknut body.

14. A locknut comprising an annular locknut body having an inner surface and an outer surface, means on said inner surface for engaging a lug in mounted relationship, an annular shroud having an inner surface and an outer surface, said annular shroud being rotatably mounted in substantially coaxial relationship on said annular locknut body with said inner surface of said annular shroud facing said outer surface of said annular locknut body, a first annular ridge on said outer surface of said locknut body, a second annular ridge on said inner surface of said annular shroud, a first shoulder on said first annular ridge, a second shoulder on said second annular ridge facing said first annular shoulder, said second annular shoulder having an inner diameter which is greater than the external diameter of said outer surface of said annular locknut body located in contiguous relationship thereto for permitting said rotatable mounting between said annular shroud and said annular locknut body, a first end on said locknut body for bearing against an external surface, a second end on said shroud located radially outwardly of said first end, key-receiving lobe means on said outer surface of said annular locknut body within said shroud and extending both radially and axially of said locking body, a key-receiving opening in said annular shroud at the opposite end thereof from said second end of said shroud, and seal means effectively mounted about said annular locknut body and in engagement with said annular shroud and extending beyond said first end of said locknut body for bearing against said external surface for sealing against entry of foreign matter onto said lobe means from said first end of said locknut body while permitting relative rotation between said locknut body and said shroud and while effecting a biasing relationship between said first and second shoulders to thereby prevent vibration between said locknut body and said annular shroud.

* * * * *

UNITED STATES PATENT AND TRADEMARK OFFICE
CERTIFICATE OF CORRECTION

PATENT NO. : 4,897,008

DATED : January 30, 1990

INVENTOR(S) : Jeffery R. Parks

It is certified that error appears in the above-identified patent and that said Letters Patent is hereby corrected as shown below:

Column 1, line 15, cancel "the" (second occurrence);
         line 39, change "is" to --in--;
         line 53, cancel "the" (second occurrence).

Column 2, line 38, change "be" to --by--.

Column 4, line 30, change "forces" to --forced--;
         line 34, change "provided" to --provide--.

Column 8, line 12 (claim 14), change "locking" to --locknut--.

Signed and Sealed this

Eighth Day of January, 1991

Attest:

HARRY F. MANBECK, JR.

*Attesting Officer*       *Commissioner of Patents and Trademarks*